No. 707,991. Patented Aug. 26, 1902.
F. A. WAREHAM.
COUPLING.
(Application filed Apr. 18, 1901.)
(No Model.)
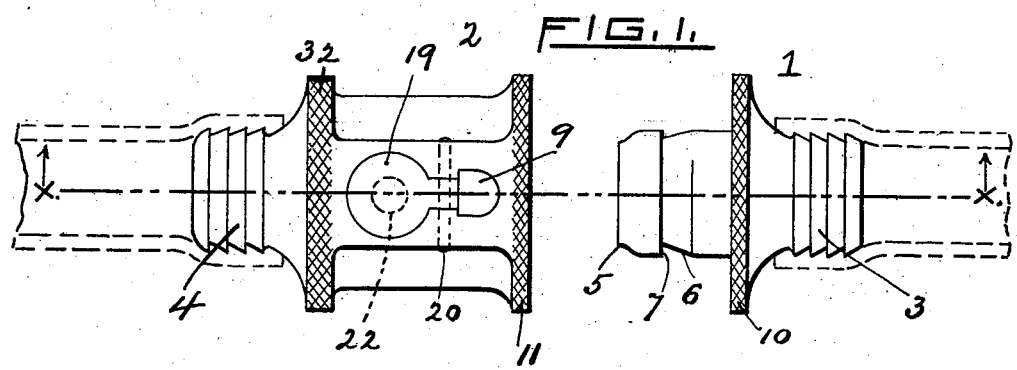
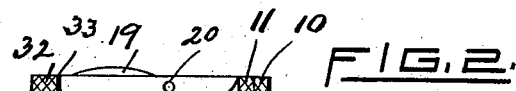
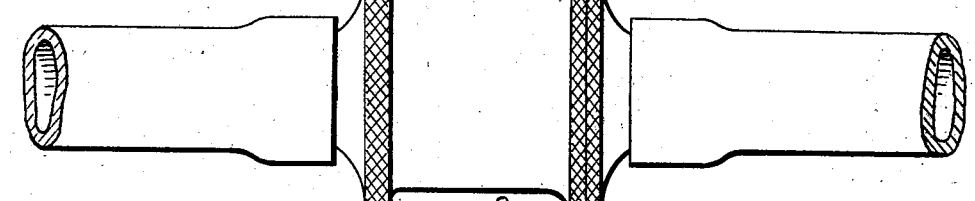
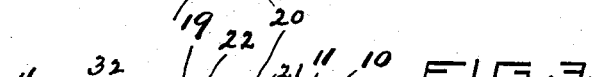
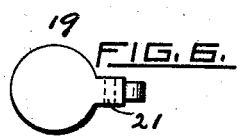
WITNESSES.
Charles C. Hannigan.
Florence R. Bowen.
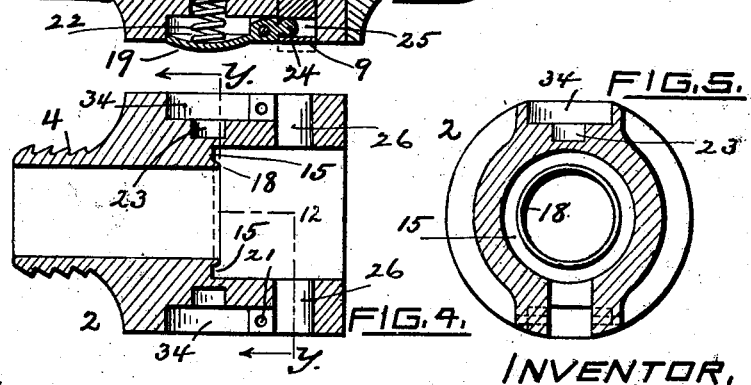
INVENTOR.
Fred A. Wareham
By William M. P. Bowen
Atty.
THE NORRIS PETERS CO., PHOTO-LITHO., WASHINGTON, D. C.

UNITED STATES PATENT OFFICE.

FRED A. WAREHAM, OF EAST PROVIDENCE, RHODE ISLAND.

COUPLING.

SPECIFICATION forming part of Letters Patent No. 707,991, dated August 26, 1902.

Application filed April 18, 1901. Serial No. 56,491. (No model.)

*To all whom it may concern:*

Be it known that I, FRED A. WAREHAM, a citizen of the United States, residing at East Providence, in the county of Providence and State of Rhode Island, have invented a new and useful Coupling, of which the following is a specification.

My invention relates to improvements in couplings in which the male and female members are readily attachable and detachable by means of a locking device and gripping-flange and operate in conjunction with a washer to form a water-tight swivel-coupling for hose, pipe, syringes, or any article where a coupling is desired; and the objects of my improvement are, first, to provide a simple automatic locking and detachable swivel joint or coupling without screw-threads or additional fastenings; second, to provide a washer of a shape adapted to render the connection water-tight; third, to provide a gripping-flange to assist in detaching the coupling, and, fourth, to protect the parts from injury as much as possible by interior construction and non-corroding materials. I attain these objects by the mechanism illustrated in the accompanying drawings, in which—

Figure 1 is a side elevation of the coupling with the members separate. Fig. 2 represents the parts together. Fig. 3 is a longitudinal section of the entire coupling with the parts together. Fig. 4 is a central longitudinal section of the female member 2. Fig. 5 is a cross-section in Y Y, Fig. 4, of the female member 2. Fig. 6 is a top plan view of the latch. Fig. 7 is an edge view of the latch, and Fig. 8 is a perspective view of the post.

Similar numerals refer to similar parts throughout the several views.

The hose is attached to the male member 1 and the female member 2 at 3 and 4, respectively, in any usual way, (see Fig. 1,) or the male member 1 and the female member 2 form, respectively, the ends of the pipe to be coupled or joined in the longitudinal direction X X of the parts 1 and 2, Fig. 1. The male member 1 is formed with the outside surface slightly tapering at the entering end 5 and with an annular groove 6 cut in such outside surface a short distance from such entering end, with the bearing portion 7 of such groove formed straight and vertical to receive the inside projecting ends 8 of the posts 9 (see Figs. 3 and 8) of the locking device of the female member 2 when locked in position and allowing the two parts of the coupling to revolve on each other when so locked in position. (See Figs. 2 and 3.) The male member 1 is provided still farther from such entering end 5 with a buffer 10, milled on its outside circumference to bring up against a similar buffer 11, also milled on its outside circumference on the receiving end of the female member 2 when the two parts of the coupling are locked in position ready to revolve on each other. The female member 2 is provided with a round chamber 12, Fig. 3, to receive the entering end of the male member 1, the washer 13, and the projecting end 8 and face 14 of the posts 9 of the locking device entering into the annular groove 6 of the male member 1 when the two parts of the coupling are locked in position. The back of the chamber 12 is principally straight and vertical to receive snugly the similarly straight and vertical flange 17 of the washer 13, but is provided at its outside circumference with a small annular groove 15, forming a rectangular recess for the reception of the outer circumference 16 of such flange 17 of the washer 13 and to prevent such washer 13 from falling out of the female member 2 when the two members are detached, Figs. 3 and 4. The back of the chamber 12 is also provided, as shown in Fig. 3, with a slight tapering or sharpened circular projection in the general longitudinal direction X X, Fig. 1, of the hose or pipe for the purpose of pressing into such flange 17 of the washer 13 and alone or in conjunction with the pressure on the washer 13 of the contents passing through the hose or pipe to form a water-tight coupling or connection. The washer 13 is constructed of soft pure rubber or similar substance and is elongated at right angles to its flange 17, Fig. 3, and slightly tapering at its circumference 35, so as to pass within the entering end 5 of the male member 1 when the two parts of the coupling are locked in position, and all forming a water-tight coupling or connection, as hereinbefore stated, while still allowing the male member 1 and the female member 2 to revolve on each other.

At opposite places on the outside circumference of the female member 2 the surface is thickened in the longitudinal direction X X, Fig. 1, of the hose or pipe to allow room for the construction of the locking device, and the connecting-angles are not sharp, but rounded, so as to prevent injury in handling and any accumulation of dirt or other substances, Fig. 5. The locking device consists of two or more latches 19 on opposite sides of the exterior of the female member 2, Fig. 3, forming movable portions of the exterior of such female member 2, each latch hung at about its middle upon a pin 20, running through a horizontal circular hole 21 cut at right angles to the general longitudinal direction X X, Fig. 1, of the hose or pipe in the exterior portion of the thickened part of the female member 2, as shown in Fig. 3, Fig. 4, and the cross-section of Fig. 4 at Y Y shown in Fig. 5, one end of each latch slightly convex and under such end of each latch a spring 22 held in a small spring-chamber 23 of the female member 2, such spring serving to hold the outside edges of each latch even with the exterior adjoining surface of the female member 2, Figs. 3 and 7. Each latch is provided with a small projecting lug 24, Figs. 6 and 7, with its horizontal bearing-surfaces rounded, such lug working into a horizontal circular receiving-hole 25 of the post 9, extending partly or entirely through said post 9 or working into a horizontal groove extending partly or entirely across the face of such post 9, which touches the latch 19, but not permanently fastened in such hole or groove, Figs. 3, 6, 7, and 8. The two posts 9, or the posts 9 forming part of such locking device and being also movable portions of the exterior of the female member 2, (see Fig. 3,) extend each through a vertical fitting-hole 26 of the female member 2, Figs. 3 and 4. Each post projects into the receiving-chamber 12 of the female member 2, and when the two parts of the coupling 1 and 2 are locked together in position its projecting end 8, formed straight and vertical, rests against the bearing portion 7 of the annular groove 6 of the male member 1. The side 27 of such post 9 toward the male member 1 is formed rounded vertically, the side 28 away from the male member 1 is formed (continuing its projecting end 8) straight and vertical, and the sides 29 and 30 are formed parallel and vertical, Fig. 8. The face 14, projecting into the chamber 12, is formed slightly hollowed, so as to fit the annular groove 6 of the male member 1 and sloping from its end 8 to its end 31, Fig. 3, toward the interior surface of the rounded chamber 12 of the female member 2 and adapted to receive the end 5 of the male member 1 when entering the female member 2, and permit such end 5 to be pushed along into the female member 2 until the post 9 enters the annular groove 6 of the male member 1, and the projecting end 8 of such post 9 rests against the side 7 of such annular groove 6, and the two parts of the coupling are automatically locked in position.

On the exterior of the female member 2 and slightly beyond the latches 19, away from them in the general longitudinal direction X X, Fig. 1, of the male member 1, the circumference of the female member 2 is raised by a vertically-projecting flange 32, Figs. 1, 2, and 3, slightly rounded on the edge 33, where the female member 2 is not thickened, with its connecting-angles rounded and milled on its outside circumference, forming a gripping-flange to assist in detaching the two couplings. The latches 19 when simultaneously pressed toward the interior of the female member 2 into their latch-chamber 34 by the simple pressure of one hand of the operator readily and without the intervention of any other agency operate as levers to raise the posts 9 out of the annular groove 6 of the male member 1, Fig. 3, and permit the operator, with the other hand pulling against the gripping-flange 32 of the female member 2, to separate readily and so disconnect the two parts of the coupling.

All parts of the coupling are constructed of non-corroding materials.

In constructing the spring 22 it may be of different forms, and it may also be placed in the latch-chamber 34 without constructing any special spring-chamber 23.

What I claim as my invention, and desire to secure by Letters Patent, is—

1. In a coupling, the combination with a male member having a tapering end and an inclined contracted portion forming a vertical shoulder, of a female member having an annular chamber therein engaging said end of the male member, the rear wall of said chamber having an annular groove therein, an annular washer carrying a flange, the flange being secured in said groove in said chamber and being engaged by said tapering end of the male member, the washer engaging the inner circumference of the male and female members, enlarged portions on opposite sides of said female member having vertical openings therein, posts having lower inclined faces for engagement with said tapering portion and said shoulder of the male member, the upper ends of said posts having horizontal openings therein, a latch secured to each of said enlarged portions in an opening provided therefor on the upper face of the enlarged portion, a pin passing through said latch and secured in said enlarged portions, a rounded lug formed integral with one end of the latch and normally mounted in said horizontal openings in the posts, the other end of said latch being convex in cross-section forming a seat on its under face and a thumb-operating member on its upper face, and a spring engaging said seat and in an opening provided therefor on the upper face of said enlarged portion, an annular flange formed integral with each end of the female member, and an annular flange formed integral with the rear end of the male member for engagement with the front flange of the female member when the members are locked, substantially as described.

2. In a coupling, the combination of a male member having a tapering end and an annular flange carried in proximity to the end, of a female member having a chamber formed therein and carrying a flange at its end for engagement with said flange carried by the male member, the end portion of the male member engaging the inner circumference of said chamber in the female member, the rear wall of said chamber having an annular groove formed therein, a projection formed at the lower end of said groove, a washer having an elongated portion for engaging with the inner circumference of said male and female members, said washer carrying a flange for engagement in said groove in said chamber and said projection, the other face of said flange being engaged by said tapering end of the male member, substantially as described.

In testimony whereof I have signed my name to this specification in the presence of two subscribing witnesses.

FRED A. WAREHAM.

Witnesses:
JAMES F. CROWELL,
FLORENCE R. BOWEN.